3,654,170
PROCESS OF INHIBITING SCALE USING MIXTURES OF PYROPHOSPHATES AND DITHIOPHOSPHORIC ACIDS
Alfred Eugene Woodson, Festus, Mo., assignor to Petrolite Corporation, Wilmington, Del.
No Drawing. Filed Dec. 18, 1969, Ser. No. 886,376
Int. Cl. C23f 14/02
U.S. Cl. 252—181                 12 Claims

ABSTRACT OF THE DISCLOSURE

Pyrophosphates, or mixture of pyrophosphates with the O,O-disubstituted dithiophosphoric acids, are particularly useful as scale inhibitors for aqueous systems.

The pyrophosphates employed herein contain both oxygen and sulfur, of the formula

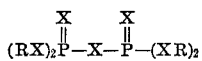

where X is oxygen or sulfur such as those of the formula

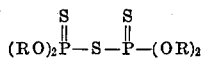

and

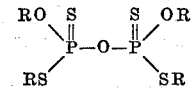

where R is other than a lower alkyl group (i.e. containing less than seven carbon atoms) and preferably a higher alkyl (i.e. at least six carbons), phenol, etc., and most preferably an oxyalkylated radical. Pyrophosphates are prepared by reacting $P_2S_5$ with the appropriate alcohol and continuing the reaction to convert the O,O-disubstituted dithiophosphoric acid initially formed to the pyrophosphate. The resulting product usually contains the O,O-disubstituted dithiophosphoric acid in addition to the pyrophosphate.

---

This invention relates to the use of the pyrophosphates of this invention in inhibiting the formation of scale on surfaces, such as on pipes or other equipment. They are particularly useful in inhibiting the deposit of scale in equipment used in producing and handling crude oil since water produced from the earth, along with oil, also deposits inorganic solids such as scale in the well tubing or more commonly in traps, heaters or other surface equipment and even in pipelines. They are also valuable in inhibiting scaling which may accumulate in steam generating equipment if hard waters are used. Utility is not limited to such characteristic applications but can be used in other instances where scale or deposits of inorganic solids from aqueous media constitute a nuisance in industrial or other activities.

The process is particularly effective in preventing and/or reducing the formation of scale by introducing the composition of this invention with the incoming waters before scale has accumulated, as a preventative measure. It is usually preferred to introduce by means of a proportioning pump a continuous stream of the compositions into the incoming scale-forming water.

In application Ser. No. 821,144, filed May 1, 1969, there is described and claimed dithiophosphoric acids and uses thereof.

Although the reaction of simple alcohols with $P_2S_5$ primarily proceeds according to the following equation

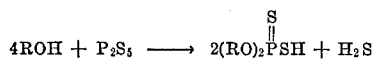

with minor side reactions, it has been found that when certain alcohols are reacted, for example higher alkyl alcohols, phenols, oxyalkylated alcohols, etc., side reactions predominate. Thus,

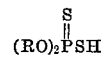

initially formed from such alcohols yields through anhydride formation and/or isomerization pyrophosphates as illustrated in the following equations:

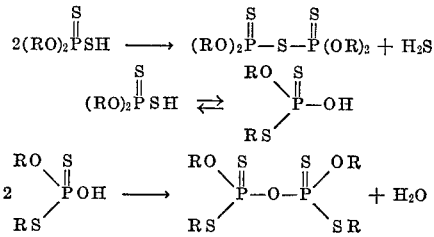

Although the ratio of products will vary with reactants, properties, reaction conditions, etc., a typical reaction product ratio of products formed by reacting an oxyalkylated alcohol with $P_2S_5$ is as follows:

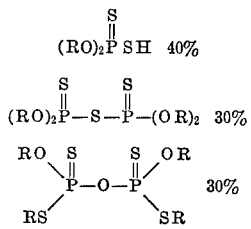

Thus, the major part of the product comprises anhydrides and/or isomerized anhydrides (i.e. pyrophosphates) which are excellent scale inhibitors.

The production of pyrophosphates which contain both sulfur and oxygen of the formula

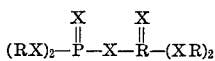

where X=O or S in substantial amounts is unexpected since the reaction of simple alcohols, such as lower alkyl alcohols ROH, with $P_2S_5$ yields little, if any, pyrophosphates. See Houben-Weyl, Phosphorus Compounds, Part II, p. 684, published by Georg Thieme Verlag in 1964. In contrast where the more complex alcohols are reacted, for example, oxyalkylated alcohols such as of the formula $R'(OA)_nH$ where R' is alkyl cycloalkyl, alkenyl, aryl, aralkyl, alkaryl, heterocyclic, etc., higher alkyl alcohols such as where R has at least seven carbon atoms, etc., pyrophosphates comprise a substantial part of the resultant reaction product. In general, the yield of pyrophosphate is increased by prolonged heating. Thus, in order to increase the yield of pyrophosphates, in contrast to reaction time of 1–3 hours for the dialkyl dithiophosphates, reaction times at elevated temperatures of more than 3 hours, such as 3–15 or more hours, enhance the yield of pyrophosphates. The use of vacuum or reduced pressure during this heating period also enhances the yields of pyrophosphates, e.g. 20 mm.–150 mm.

The general procedure for reacting alcohols with $P_2S_5$ to form dithiophosphoric acids is to continue reaction until most of the $P_2S_5$ has dissolved and the evolution of $H_2S$ has subsided. In contrast, the general procedure for preparing the pyrophosphates is to continue the reaction past this point so as to shift the equilibrium in favor of converting the dithiophosphoric acids to the pyrophosphate.

Since the crude reaction products contain O,O-disubstituted dithiophosphoric acids

salts of these can also be prepared.

The salts are prepared by the simple neutralization of the acid with a suitable salt-forming base or by double decomposition. The salt moiety may be for example, Cu, Ni, Al, Pb, Hg, Cd, Sn, Zn, Mg, Na, K, $NH_4$, amine, Co, Sr, Ba, etc. These may be prepared from the corresponding oxide, hydroxide, carbonate, sulfide, etc. An alternative to the preparation of salts is to use a simple combination of dithiophosphate with a metal salt such as zinc chloride, zinc sulfate, etc. This allows the use of higher stoichiometric amounts of metal ions to dithiophosphate, such as from 1:1 to 4:1.

The alcohols employed to prepare the ester may be oxyalkylated alcohols for example of the formula $$R(OH)_nH$$

where OA is a moiety derived from an alkylene oxide and $n$ is a number for example from about 1–100 or more, for example from 1–50, such as from 1–25, but preferably from 1–10.

The alkylene oxides employed herein are 1,2-alkylene oxides of the formula

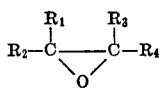

where $R_1$, $R_2$, $R_3$ and $R_4$ are selected by the group consisting of hydrogen, aliphatic, cycloaliphatic, aralkyl, etc. for example ethylene oxide, propylene oxide, butylene oxide, amylene oxide, octylene oxide, styrene oxide, methyl styrene oxide, cyclohexene oxide (where $R_1$ and $R_3$ are joined to make a ring), etc.

The alkylene oxide may be added to form homo-polymer, stepwise to form block polymers, as mixtures to form hetero-polymers or combinations thereof, etc.

For example $$R(OEt)_nH$$
$$R(OPr)_nH$$
$$R(OEt)_n(OPr)_mH$$
$$R(OPr)_n(OEt)_mH$$
$$R(OEt-OPr)_nH, \text{ etc.}$$
mixed By proper selection of the particular alkylene oxide(s), R may be a lower ($C_{1-7}$) or a higher alkyl $$(C_{>7})$$

The following examples are presented by way of illustration and not of limitation.

EXAMPLE 1

This example illustrates the reaction of a higher alkanol with $P_2S_5$. Dodecyl alcohol (186 g.; 1.0 mole) was stirred vigorously while phosphorus pentasulfide (55.5 g.; 0.25 mole) was added at 20–50° C. during 1 hour. The reaction temperature was raised to 100–105° C. during 1 hour and the pressure reduced to 50 mm. Heating under vacuum was continued for 8 hours at which time no more weight loss was obtained. Yield 229.7 g. The product gave following analyses: Sulfur content 12.4%, acid value 0.86 meq./g.

From these data the composition of the product is approximately

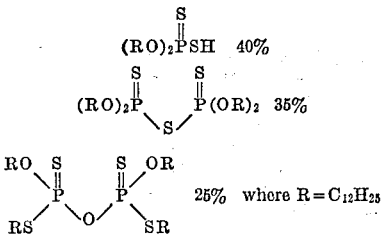

EXAMPLE 2

This example illustrates the use of different reaction conditions for the reactants of Example 1.

Dodecyl alcohol (186 g.; 1.0 mole) was heated to 90° C. and stirred gently at this temperature during the addition of $P_2S_5$ (55.5 g.; 0.25 mole) over 1½ hours. Heating was continued for 10 hours at 100°–105° C. and a vacuum of 50 mm. was then applied for 1 hour. The product was a pale yellow oil. Yield 224 g. Product gave analyses: S=13.5%, acid value 0.81 meq./g.

The composition calculated from these data is:

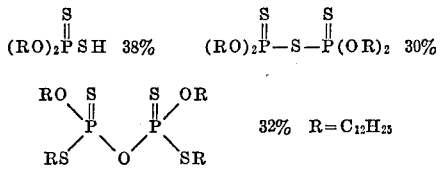

EXAMPLE 3

This example illustrates the reaction of an oxyalkylated alcohol with $P_2S_5$.

The alcohol derived from the addition of 1 weight of ethylene oxide to "Alfol" 8–10 (576 g.; 2 equiv.) was stirred at 25–40° while $P_2S_5$ (111 g.; 0.5 mole) was added during 2 hours. The reaction was heated to 105–109° at a pressure of 70 mm. for 9½ hours. Upon cooling the product, 657 g. was obtained as a pale yellow liquid. Sulfur analysis, 9.06%; phosphorus, 4.77%; acid value 0.62 meq./g.

The composition from these data is approximately:

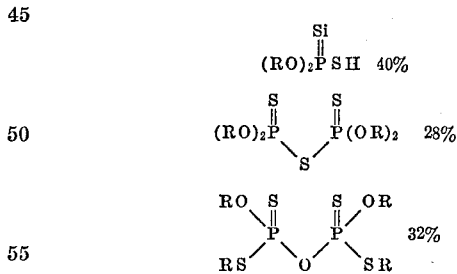

R derived from "Alfol" 8–10, i.e.

$$CH_3(CH_2)_{7-9}OH + 3.23 \text{ EtO}$$

In order to avoid repetitive details additional illustrative examples are tabulated below:

| Alcohol | | Procedure |
|---|---|---|
| Example: | | |
| 4 | "Alfol" 8–10 plus 1 weight EtO | Example 2. |
| 5 | "Alfol" 8–10 plus 2 weight EtO | Example 1. |
| 6 | P-nonylphenol plus 1.2 weight EtO | Do. |
| 7 | "Alfol" 14 plus 2 weight EtO $CH_3(CH_2)_{13}OH$ | Do. |
| 8 | do | Example 2. |

In general, the alcohols which react with $P_2S_5$ to form pyrophosphates are higher alkanols (i.e. having at least 7 carbons), phenols for example alkyl phenols where each alkyl group has from about 1–18 or more carbons, polyalkyl phenols, etc., alkylaralkyl alcohols

for example, nonylphenylmethanol, etc., cycloalkanols such as cyclohexyl alcohol, methyl cyclohexyl alcohol, etc., oxyalkylated alcohols $R(OA)_nH$; unsubstituted alcohols; heterocyclic alcohols; polyfunctional alcohols, etc. Stated another way the present process of forming pyrophosphates can be achieved by converting the O,O-disubstituted thiophosphate form to the pyrophosphate form using heat, vacuum, time, etc., to shift the equilibrium in the direction of the pyrophosphates. It is more readily carried out with the more complex alcohol as contrasted to the more simple alcohol such as lower alkanols.

The compositions of the invention are especially effective in minor amounts in the inhibition of scaling on metal surfaces by calcium sulfate, barium sulfate, and calcium carbonate. They are useful in the oil production industry to prevent deposits of these scale-producing compounds on metal surfaces of pumps, pipes, valves, tanks, and the like when waters containing the scale-producing compounds (or precursors thereof, e.g., calcium bicarbonate) are treated in the concentrations of about 0.5 to 5,000 or more parts per million, such as from about 5 to 1,000 p.p.m., but preferably about 10 to 500 p.p.m. The optimum phase will vary with the particular compound, system, etc. Higher concentrates can also be employed such as 10,000 or more p.p.m. The optimum p.p.m. is a balance between function and cost. Places where scale buildup is most likely to become troublesome are those in the liquid handling systems wherein there is a change in fluid pressure, a change in fluid temperature, or a change in fluid flow rate.

The invention may be used in waterflood systems used to inject water into subterranean formations, wherein the water is brackish or is a brine conductive to scale formation on metal surfaces of the waterflood system. Typical brines encountered in waterflood operations, wherein water is drawn from sources available at or near the waterflood site, are in mg./liter:

|  | Brine A | Brine B |
| --- | --- | --- |
| Chloride (NaCl), mg./l | 40,000 | 28,000 |
| Total hardness (CaCO₃), mg./l | 5,300 | 3,400 |
| Calcium (CaCO₃), mg./l | 4,900 | 1,600 |
| Sulfate (NaSO₄), mg./l | 0 | 4,750 |
| pH | 7.8 | 8.3 |

The compositions of the invention are useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formations can be minimized. For example, these compositions are effective in preventing barium sulfate scale in waterflood systems. In oil producing wells which produce oil and brine, bad scaling by barium sulfate or calcium carbonate can cause the wells to be pulled every two or three weeks. By batch treatment or continuous treatment thereof with these compositions, the well will rarely need to be pulled for reasons of scaling.

These compositions being liquid are easily applied for example by continuous injection from a proportioning pump in contrast to inorganic scale inhibitors.

The effectiveness of the compositions of this invention as scale inhibitors was demonstrated by a test apparatus designed to measure deposition of scale from scaling waters. The apparatus and its operation is described in Oil and Gas Journal, vol. 67, p. 166 (1960). In this test deposition of calcium sulfate from scaling water was measured:

| Compound | Concentration of Compound, p.p.m. | Deposit, mg. | Inhibition, percent |
| --- | --- | --- | --- |
| Blank | | 205 | |
| Example 1 | 30 | 43 | 80 |
| Example 3 | 30 | 39 | 81 |
| Commercial inhibitor | 30 | 50 | 75 |

The compositions of this invention also demonstrated unusual ability to inhibit scale formation from a water with scaling tendency having typical analysis shown below:

|  | P.p.m. |
| --- | --- |
| $HCO_3^-$ | 354 |
| $Cl^-$ | 1915 |
| $SO_4^{--}$ | 2600 |
| $Ca^{++}$ | 720 |
| $Mg^{++}$ | 280 |
| Total dissolved solids | 7124 |

These scale inhibitor tests were run in conjunction with corrosion tests using the apparatus described for the corrosion tests namely a cylindrical container of 1500 ml. capacity with provision for heating and stirring and in which were placed three sand blasted 1020 mild steel coupons attached to the lid. These tests were conducted at 180° F. The effectiveness of the scale inhibitors were determined by a visual examination of the amount of scale

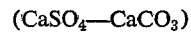

deposited on the metal coupons in 24 hrs. at 180° C.

The results are tabulated below:

| Composition | Concentration of compounds in p.p.m. | Observation after 24 hours |
| --- | --- | --- |
| Blank | | Very heavy scale. |
| Example: | | |
| 1 | 500 | No scale. |
| 3 | 500 | Very little scale (~90% protected). |
| 5 | 500 | Very little scale (~80% protected). |
| 6 | 500 | Light scale (~70% protected). |
| 1 | 250 | Very light scale (~95% protected). |
| 1 | 100 | Very light scale (~85% protected). |
| Commercial scale inhibitor Dequest 2000 | 100 | Heavy scale. |

In summary, the present invention relates to the pyrophosphates, alone or in combination with dithiophosphates or salts thereof and to the use as scale inhibitors in a wide variety of scale forming aqueous systems. The pyrophosphates may be employed as the crude product resulting from the reaction of the alcohol with $P_2S_5$ or may be separated from the reaction mixture.

As is quite evident, new pyrophosphates will be constantly developed which could be useful in this invention. It is, therefore, not only impossible to attempt a comprehensive catalogue of such compositions, but to attempt to describe the invention in its broader aspects in terms of specific chemical names used would be too voluminous and unnecessary since one skilled in the art could by following the description of the invention herein select a useful pyrophosphate. This invention lies in the use of suitable pyrophosphates as scale inhibitors in aqueous systems and their individual compositions are important only in the sense that their properties can affect this function. To precisely define each specific useful pyrophosphate and aqueous system in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific pyrophosphates suitable for this invention by applying them in the process set forth herein. In analogy to the case of a machine, wherein the use of certain materials of construction or dimensions of part would lead to no practical useful result, various materials will be rejected as inapplicable where others would be operative. I can obviously assume that no one will wish to use a useless pyrophosphate nor will be misled because it is possible to misapply the teachings of the present disclosure to do so. Thus, any pyrophosphate or mixtures containing them that can perform the function stated herein can be employed. Although O,O-dithiophosphates alone may be used as scale inhibitors, their use in conjunction with pyrophosphate is preferred.

Having thus described my invention what I claim as new and desire to obtain by Letters Patent is:

1. A process of inhibiting scale formation which comprises treating a scale formation aqueous system with a mixture of compounds consisting essentially of
   (I) a mixture of different compounds, each having the formula $$(RX)_2-\underset{\underset{X}{\|}}{P}-X-\underset{\underset{X}{\|}}{P}-(XR)_2 \text{ and}$$

(II) a compound or a mixture of compounds each having the formula $$(RO)_2\underset{\underset{S}{\|}}{P}SM$$

where R is a radical having at least six carbon atoms or an oxyalkylated radical, X is oxygen or sulfur, each of said different compounds in I containing both oxygen and sulfur, and M is hydrogen or a metal, said mixture of compounds I and II being prepared by reacting alcohol or a mixture of alcohols with $P_2S_5$ first to form O,O-disubstituted dithiophosphoric acid or a mixture thereof until most of the $P_2S_5$ has dissolved and the evolution of $H_2S$ has subsided and then continuing the reaction to shift the equilibrium in favor of converting dithiophosphoric acid or a mixture thereof to the pyrophosphates, with the proviso that, where M is a metal, dithiophosphoric acid or a mixture thereof is neutralized with a salt-forming base or by double decomposition.

2. The process of claim 1 wherein R is an oxyalkylated radical derived from $R'(OA)_nH$, R' being alkyl or alkaryl or polyalkaryl or alkarylalkyl, OA being alkylene oxide and $n$ being greater than zero.

3. The process of claim 2 wherein $n$ is about 1–10 and alkylene oxide is ethylene oxide, or propylene oxide, or a mixture of ethylene oxide and propylene oxide.

4. The process of claim 1 wherein I is a mixture of different compounds having the formulae $$(RO_2)-\underset{\underset{S}{\|}}{P}-S-\underset{\underset{S}{\|}}{P}-(OR)_2$$

and

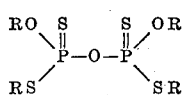

and II is a compound or a mixture of compounds each having the formula $$(RO)_2\underset{\underset{S}{\|}}{P}SH$$

and R is the same or different.

5. The process of claim 4 wherein R is an oxyalkylated radical derived from $R'(OA)_nH$, R' being alkyl or alkaryl or polyalkaryl or alkarylalkyl, OA being alkylene oxide and $n$ being greater than zero.

6. The process of claim 5 wherein $n$ is about 1–10 and alkylene oxide is ethylene oxide, or propylene oxide, or a mixture of ethylene oxide and propylene oxide.

7. The process of claim 4 wherein I is a mixture of $$(C_{12}H_{25}O)_2-\underset{\underset{S}{\|}}{P}-S-\underset{\underset{S}{\|}}{P}-(OH_{25}C_{12})_2$$

and

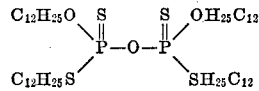

and II is $$(C_{12}H_{25}O)_2\underset{\underset{S}{\|}}{P}-SH$$

8. The process of claim 5 wherein R' is alkaryl.
9. The process of claim 8 wherein OA is ethylene oxide.
10. The process of claim 5 wherein R' is alkyl.
11. The process of claim 10 wherein OA is ethylene oxide.
12. The process of claim 11 wherein I is present in a major amount.

References Cited

UNITED STATES PATENTS

| | | | |
|---|---|---|---|
| 2,567,154 | 9/1951 | Kosolapoff | 260—988 |
| 2,630,450 | 3/1953 | Harman | 260—988 X |
| 2,665,295 | 1/1954 | Augustine | 260—981 X |
| 2,983,644 | 5/1961 | Willard | 260—981 X |
| 3,005,006 | 10/1961 | Millikan | 260—981 X |
| 3,069,453 | 12/1962 | Peissker | 260—988 |
| 3,361,671 | 1/1968 | Lowe | 252—389 X |
| 3,428,662 | 2/1969 | Millerdorf | 260—981 X |
| 3,502,587 | 3/1970 | Stanford | 252—8.55 X |

JOHN T. GOOLKASIAN, Primary Examiner

M. E. McCAMISH, Assistant Examiner

U.S. Cl. X.R.

21—2.7; 134—3, 41; 252—8.55 B, 175, 180; 260—981, 988